US006806967B2

United States Patent
Atia et al.

(10) Patent No.: US 6,806,967 B2
(45) Date of Patent: Oct. 19, 2004

(54) SYSTEM AND PROCESS FOR SIDE MODE SUPPRESSION BY TUNABLE FILTER TRAIN ALIGNMENT IN FIBER OPTIC SYSTEM

(75) Inventors: Walid A. Atia, Lexington, MA (US); Randal A. Murdza, North Andover, MA (US)

(73) Assignee: Axsun Technologies, Inc., Billerica, MA (US)

( * ) Notice: Subject to any disclaimer, the term of this patent is extended or adjusted under 35 U.S.C. 154(b) by 66 days.

(21) Appl. No.: 10/440,838

(22) Filed: May 16, 2003

(65) Prior Publication Data
US 2003/0202190 A1 Oct. 30, 2003

Related U.S. Application Data

(63) Continuation of application No. 09/747,580, filed on Dec. 22, 2000, now Pat. No. 6,628,407.

(51) Int. Cl.[7] ............................................. G01B 11/00
(52) U.S. Cl. ...................................... 356/519; 356/153
(58) Field of Search ................................ 356/454, 455, 356/519, 517, 485, 490, 153, 579

(56) References Cited

U.S. PATENT DOCUMENTS

| 5,212,746 | A | 5/1993 | Miller et al. |
|---|---|---|---|
| 5,926,594 | A | 7/1999 | Song et al. |
| 6,204,970 | B1 | 3/2001 | Hellman et al. |
| 6,384,978 | B1 | 5/2002 | Singh et al. |
| 6,628,407 | B2 * | 9/2003 | Atia et al. .................. 356/519 |

FOREIGN PATENT DOCUMENTS

| EP | 0 545 584 A1 | 6/1993 | ............ G02B/6/42 |
|---|---|---|---|
| EP | 1 211 535 A2 | 6/2002 | ........... G02B/6/293 |

* cited by examiner

Primary Examiner—David V. Bruce
Assistant Examiner—Hoon Song
(74) Attorney, Agent, or Firm—J. Grant Houston

(57) ABSTRACT

A process for tunable filter train alignment comprises detecting a spectral response of the filter train and aligning an optical fiber that transmits an input optical signal to the filter train during operation. Further, the tunable filter is moved relative to the filter train in response to a spectral response of the filter train. As a result, the alignment and spectral response of the tunable filter train are optimized. In the preferred embodiment, the alignment and SMSR optimization occur simultaneously with respect to each other.

32 Claims, 8 Drawing Sheets

SYSTEM AND PROCESS FOR SIDE MODE SUPPRESSION BY TUNABLE FILTER TRAIN ALIGNMENT IN FIBER OPTIC SYSTEM

RELATED APPLICATIONS

This application is a continuation application of U.S. patent application Ser. No. 09/747,580, filed Dec. 22, 2000 now U.S. Pat. No. 6,628,407, by Walid A. Atia and Randal A. Murzda, entitled SYSTEM AND PROCESS FOR SIDE MODE SUPPRESSION BY TUNABLE FILTER TRAIN ALIGNMENT IN FIBER OPTIC SYSTEM. The teachings of this application are incorporated herein in their entirety by this reference.

BACKGROUND OF THE INVENTION

Tunable optical filters are useful in situations requiring spectral analysis of an optical signal. They can also be used, however, as intra-cavity laser tuning elements or in tunable detectors, for example. One of the most common, modern applications for these devices is in wavelength division multiplexing (WDM) systems. WDM systems transmit multiple spectrally separated channels through a common optical fiber. This yields concomitant increases data throughput that can be obtained from a single optical fiber. There are additional advantages associated with common amplification across the channels in an optical link and as a platform for dynamic channel/wavelength routing.

Tunable filters that operate in these WDM systems must typically be high quality/high finesse devices. Currently proposed standards suggest channel spacings of 100 GigaHertz (GHz) to channel spacings as tight as 50 GHz in the ITU grid; some systems in development have spacing of 20 GHz and less. Tunable filter systems that operate in systems having such tight channel spacings must have correspondingly small passbands when operating as monitors, receivers, and routing devices.

Typically, the design of the tunable filters is based on a class of devices generally referred to as Fabry-Perot etalons. These devices have at least two highly reflective elements defining the Fabry-Perot cavity. The tunability functionality is provided by modulating the optical length of the cavity.

Since these tunable filters are typically incorporated into larger systems offering higher levels of functionality and because the Fabry-Perot cavity must be modulated over distances corresponding to the wavelength of light that it is filtering, typically around 1,000 to 2,000 nm in wavelength, micro optical electromechanical systems (MOEMS) technology is typically used to fabricate the tunable filters. The most common implementation pairs an electrostatically deflectable membrane with a fixed reflector. Thin film technology is typically used to render the membrane and fixed reflector reflective. High quality or high finesse systems can require dielectric mirrors having greater than seven layers.

A common metric for characterizing the quality of tunable filter systems is the side mode suppression ratio (SMSR). This is the ratio between the magnitude of the lowest order mode in the spectral plot of the filter's characteristic and the magnitude of the next largest mode, which is typically, but not necessarily, the next higher order mode.

Fabry-Perot cavity designs exist that maximize SMSR. Typically, the easiest approach is to use a confocal Fabry-Perot cavity. In confocal cavities, all modes are degenerate, i.e., the modes all coexist at the same frequency, or wavelength.

MOEMS confocal cavities, however, are difficult to manufacture on commercial production scales. Spacing between the deflectable membrane and the curved mirror can be difficult to control. Moreover, curved membranes can be difficult to manufacture with the required curvature. Finally, it is difficult to maintain the confocal configuration while tuning.

A more typical configuration for MOEMS tunable filter Fabry-Perot cavities is termed a hemispherical cavity or curved-flat. In such cavities, one of the reflectors is near planar and the other reflector is curved.

When hemispheric tunable filters are used, for example, the optical train surrounding the filter must be designed with the objective to control SMSR.

One solution to controlling SMSR used in some conventional MOEMS filter systems is to integrate the tunable filter into the larger optical system by locating it between two fiber pigtails; one fiber pigtail emits the optical signal to be filtered and the other fiber pigtail collects filtered optical signal after its transmission through the tunable filter. The tunable filter is oriented to be orthogonal to the axis extending between the fiber endfaces.

SUMMARY OF THE INVENTION

As optical systems are developed that allow for higher levels of functionality in a single package, the alignment of the tunable filter element in the optical system becomes less trivial. This is especially true in systems utilizing free-space-interconnects between the tunable filter and other optical components in the system.

Improper or imprecise alignment can excite higher order modes in the optical filter train. These higher order modes are undesirable because they can cause confusion as to how many WDM channels exist in, for example, the received signal. It can also cause undesirable inter-channel crosstalk.

One of the easiest solutions to controlling SMSR contemplates the use of spatial filters. Higher order spatial modes, other than the TEM00 have generally larger modal volumes. As a result, pinhole apertures in the optical train and/or the use of single mode fiber may be used to control the side mode suppression.

Such solutions, however, have undesirable side effects. Apertures only address some of the modes. For example, the TEM20 mode has a substantial amount of power propagating along the optical axis. The use of single mode fiber suffers from similar drawbacks. Further, spatial filters degrade dynamic range and the integration of fiber into the optical train requires additional alignment steps and is orthogonal to achieving higher levels of integration. As a result, the best solution to improving the side mode suppression ratio is the robust design and manufacture of the optical train, including the tunable filter and the surrounding optics.

The present invention is directed to a method and system for optical train alignment where the optical train includes a tunable filter. Specifically, in the preferred embodiment, the SMSR of the tunable filter train is monitored while it is being actively aligned. Thus, active alignment techniques can be used to maximize the train's SMSR performance.

The preferred solution is to control the alignment of the tunable filter and the surrounding optical train to minimize the degree to which the higher order modes are excited in the filter train. This involves both controlling the alignment and mode size of the beam that is coupled into the tunable filter.

In general, according to one aspect, the invention features a process for tunable filter optical train alignment. This process comprises detecting a spectral response of the filter train and aligning an optical fiber that transmits an input optical signal to the filter train during operation. Further, the tunable filter is moved relative to the filter train, in one embodiment, in response to a spectral response of the filter train. In operation, this can be achieved by physically moving the filter or alternatively its surrounding optical train. As a result, the alignment and spectral response of the tunable filter train are optimized. In the preferred embodiment, the alignment and SMSR optimization occur simultaneously with respect to each other.

According to a preferred embodiment, the step of aligning the optical filter comprises injecting a diagnostic signal into the filter train and detecting a level of the diagnostic signal that is coupled into the optical fiber. The endface of the optical fiber is then moved in response to the level of the diagnostic signal. Specifically, in the preferred embodiment, the optical fiber is aligned so that coupling efficiency is maximized. Further, the fiber is preferably aligned with respect to a back-reflected signal from the tunable filter. Specifically, the diagnostic signal is injected through the optical fiber and then a level of back-reflected light from tunable filter is detected. The optical fiber is aligned to this back reflection. In this way, the alignment of the optical train is optimized using an active alignment technique.

According to further aspects of the preferred embodiment, a side mode suppression ratio of the spectral response of the filter optical train is detected. The tunable filter is then aligned relative to the filter train so that this side mode suppression ratio is maximized.

In the preferred implementation, the spectral response of the tunable filter train is detected in real-time by scanning the tunable filter over a single frequency or near single frequency diagnostic signal. The level of transmitted signal as a function of time corresponds generally to the tunable filter's spectral filtering characteristic. This characteristic can be analyzed for side mode suppression ratio and used to derive a feedback signal in the active alignment and/or positioning of the tunable filter relative to the rest of the optical train.

In general, according to another aspect, the invention also features a calibration system for an optical train including a tunable filter. The calibration system comprises a filter alignment system for positioning the tunable filter relative to the filter train. A signal generator is further provided for injecting a diagnostic signal into the filter train. A detection system is used to detect the diagnostic signal after interaction with the tunable filter and generate information concerning a spectral response of the filter train. Finally, a control system is used that controls the filter alignment system in response to the detected spectral response.

In one implementation, a broadband diagnostic signal is used in conjunction with a spectrum analyzer to determine the filter's spectral response. Spectrum analyzers, however, tend to be inherently high loss devices. Thus, for the dynamic range required in some applications, this approach would be relatively slow.

In the preferred embodiment, the signal generator is a generally single frequency laser have a bandwidth of less than 1 MHz, for example. A tunable filter controller is then used that tunes the tunable filter across the spectrum of the diagnostic signal.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
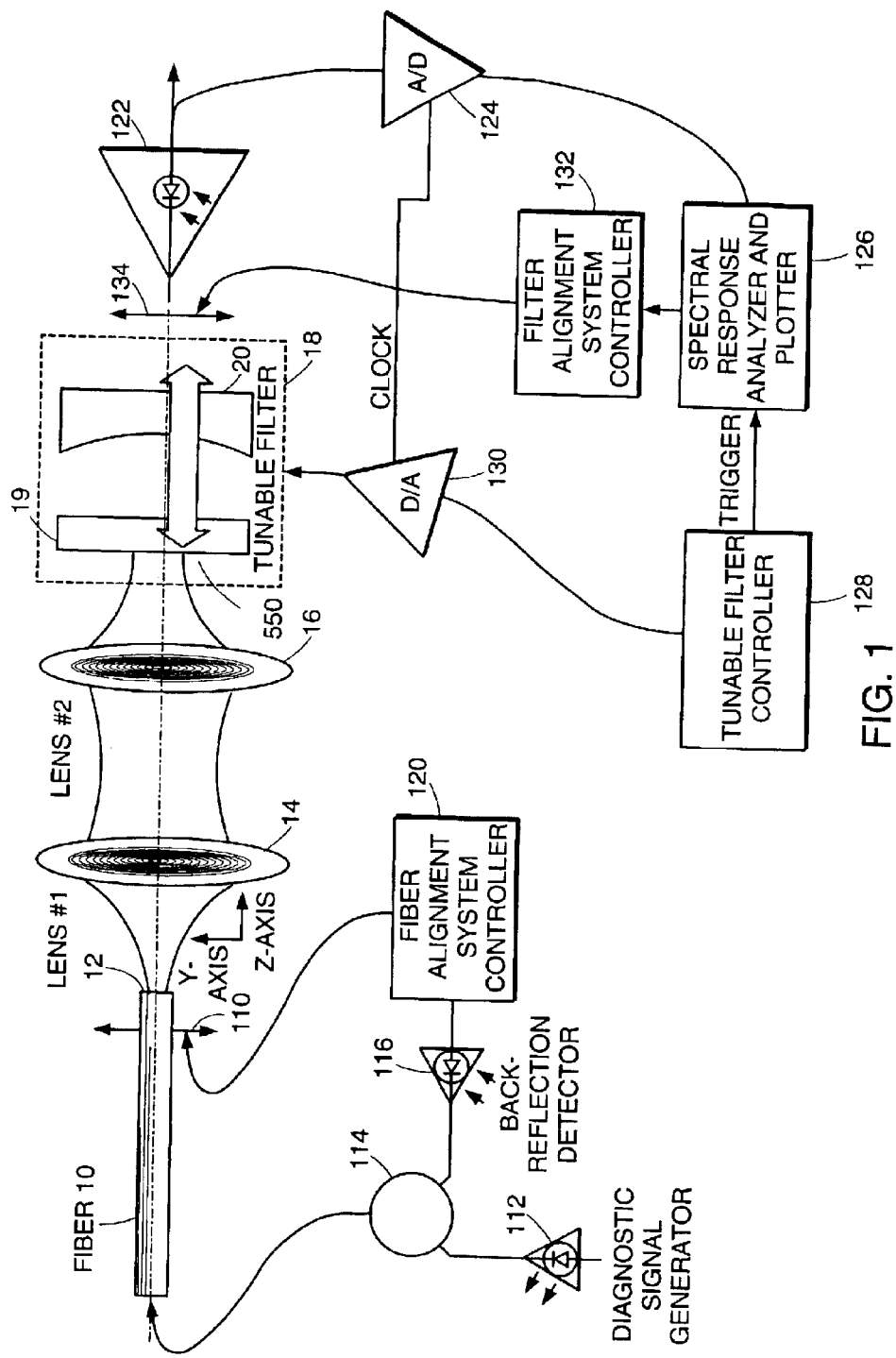
FIG. 1 is a schematic block diagram showing a calibration system for a tunable filter train according to the present invention.

FIG. 1 illustrates an exemplary tunable filter train and calibration system, which system has been constructed according to the principles of the present invention.

Specifically, the illustrated filter train is used herein to describe a context for the present invention. As such, the train comprises an optical fiber 10. Typically, in modern optical systems, especially carrier-class commercial systems, the optical fiber 10 is single mode fiber. This optical fiber has an endface 12 through which an optical signal, such as a WDM optical signal, is emitted during normal operation. Typically, the mode size in the fiber is between about 8 and 10 micrometers. In one implementation, the endface is flat cleaved. Alternatively, a fiber lens is fabricated on the endface 12.

The optical signal as emitted from the fiber endface 12 is typically diverging. In the exemplary filter train, a lens #1 14 converts the beam into a beam having a lower rate of divergence or preferably a beam waist. In the preferred embodiment, the beam that is received by lens #1 has a diameter of less than 500 micrometers ($\mu$m). Specifically, the beam size is preferably around 50 to 100 $\mu$m in diameter.

Beam is transmitted to a second lens 16 in the tunable filter train possibly through intervening optical components such as dichroic filters and/or isolators. Lens #2 16 during normal operation focuses the beam into the cavity of a tunable filter 18. Specifically, in one implementation of the filter train, the beam is focused to a spot size or beam waist of less than 50 $\mu$m, preferably about 20 $\mu$m, on reflector 19 of the tunable filter 18.

In one implementation, a tunable Fabry-Perot filter can be used as described in U.S. patent Ser. No. 09/649,168, filed on Aug. 25, 2000, by Flanders, et al., entitled Tunable Fabry-Perot Filter. The present invention, however, has applicability to other Fabry-Perot tunable devices and related tunable optical filters or other optical devices where alignment and/or side mode suppression is a relevant metric for the operation of the optical train such as dynamic gain equalizers.

The calibration system for the tunable filter train, in the illustrated embodiment comprises two alignment systems. Specifically, a fiber alignment system 110 is used to position the fiber in an x/y plane and along the z-axis. In FIG. 1, the x-axis extends in a direction orthogonal to the plane of the drawing.

The filter alignment system 134 similarly aligns the tunable filter 18 in the x/y plane and also preferably along the z-axis. These alignment systems are preferably high precision positioning systems that align the fiber and filter to tolerances of better than 10 µm. Specifically, in the preferred embodiment, to achieve high side mode suppression ratios of 20 to 30 dB and better, the fiber alignment system and the filter alignment system position the fiber 10 and tunable filter 18, respectively, to accuracies of better than one micrometer, preferably between 100 and 500 nanometers (nm) to accuracies of 25 nm.

A diagnostic signal generator 112 is used to generate a diagnostic signal into the fiber 10, and thus the filter train. In the preferred embodiment, this diagnostic signal generator is a laser, such as a single frequency laser as for example a distributed Bragg reflector laser or alternatively, a tunable laser.

The diagnostic signal is provided to the fiber pigtail 10 through a circulator or coupler 114. This allows a back reflection detector 116 to detect a level of the diagnostic signal that is coupled back into the endface 12 of the fiber 10.

In the current embodiment, the detected level of back reflection is fed to a fiber alignment system controller 118 as a feedback signal. This controller 120 controls the fiber alignment system 110. In the preferred embodiment, it positions the fiber endface 12 such that the level of the back reflected signal is maximized. Generally, this signal is produced by reflection from by the tunable filter 18. By actively positioning the fiber, using this back reflected signal under the control of the controller 20, the general state of alignment is maintained between the fiber endface 12 and the tunable filter 18.

In the preferred embodiment, while the fiber alignment system controller 120 aligns the fiber endface 12, a transmission detector 122 detects a level of signal that is transmitted through the tunable filter 18. In one implementation, this transmission detector 122 is the system detector for the filter train. Alternatively, the detector is provided as part of the diagnostic system and inserted into the filter train only for the alignment and calibration.

The signal from the transmission detector 122 is preferably analog-to-digital converted by an A/D converter 124. The digital signal is provided to a spectral response analyzer and plotter 126. In the illustrated configuration, the digital signal as a function of time corresponds to the filter's spectral transmission characteristics.

In the preferred embodiment, simultaneously with monitoring the output from the transmission detector 122, a tunable filter controller 128 controls a tuning signal to the tunable filter 18. In the preferred embodiment, the tunable filter controller 128 sends a digital signal to a digital-to-analog converter 130 that generates a tuning voltage to the tunable filter 18. Typically, this is a ramp voltage, for example, that is used to control a voltage in an electrostatic drive cavity of the tunable filter 18. Preferably, the digital-to-analog converter 130 and the analog-to-digital converter 124 are synchronized by a clock signal. Thus, the drive voltage to the tunable filter is synchronized with the sampling at the transmission detector 122. The result of this synchronization is that the spectral response analyzer generates information regarding the spectral response of the tunable filter train.

In more detail, the tunable filter is scanned across the single frequency of the diagnostic signal. The diagnostic signal essentially acts as a probe to identify the spectral location of the main peak and the side or satellite modes in the filter's characteristic by time domain response of detector 122. This information regarding the spectral response is then used by the analyzer 126 to control the filter alignment system 134 via the filter alignment system controller 132 and/or the fiber alignment system 110 via the fiber alignment controller 120.

Figures 1, 2A:
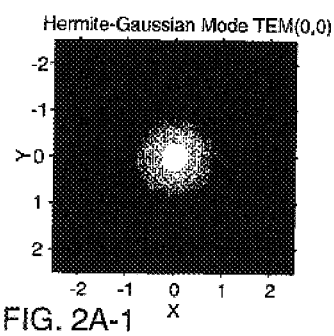
FIGS. 2A and 2B show the is energy distributions for some exemplary electromagnetic spatial, Hermite-Gaussian modes.
Figures 2, 2A:
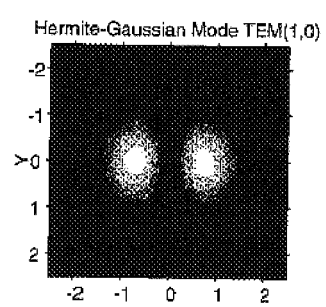
Figures 2, 2A, 3:
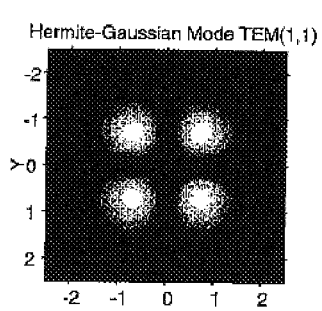
FIG. 3 is a block diagram of a filter optical train to which the inventive calibration system and alignment process are applied, in one example.
Figures 2, 2A, 3, 4:
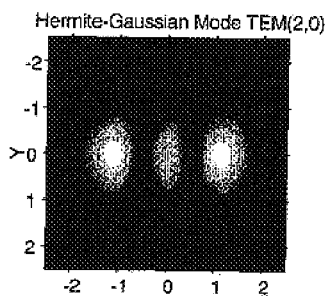
FIG. 4 is a perspective view of an optical channel monitor to which the present invention is applicable, in one example.
Figures 2, 2A, 3, 4, 5:
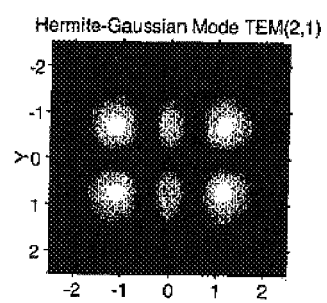
FIG. 5 is a process diagram illustrating the tunable filter train alignment process.
Figures 2, 2A, 3, 4, 5, 6:
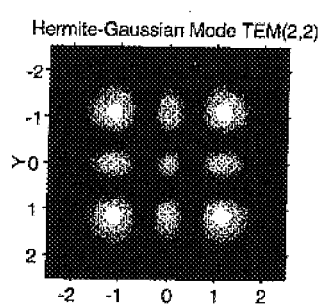
FIG. 6 is a plot of transmitted power as a function of tuning voltage of a tunable filter train having a low side mode suppression ratio.
Figures 1, 2B:
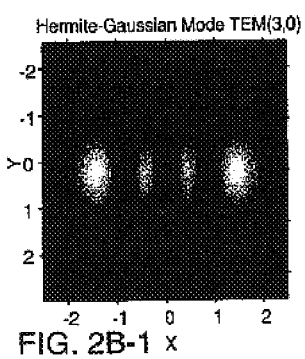
Figures 2, 2B:
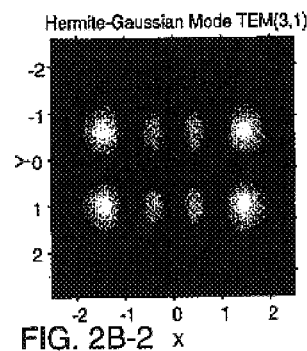
Figures 2, 2B, 3:
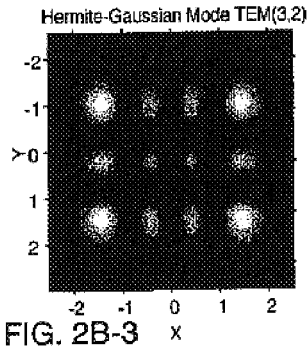
Figures 2, 2B, 3, 4:
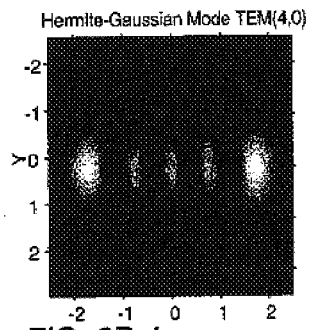
Figures 2, 2B, 3, 4, 5:
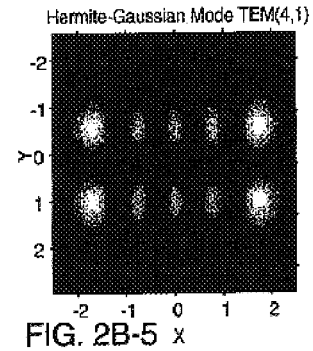
Figures 2, 2B, 3, 4, 5, 6:
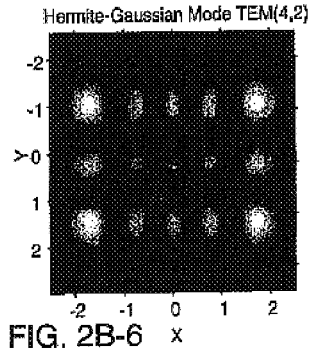
Figure 3:
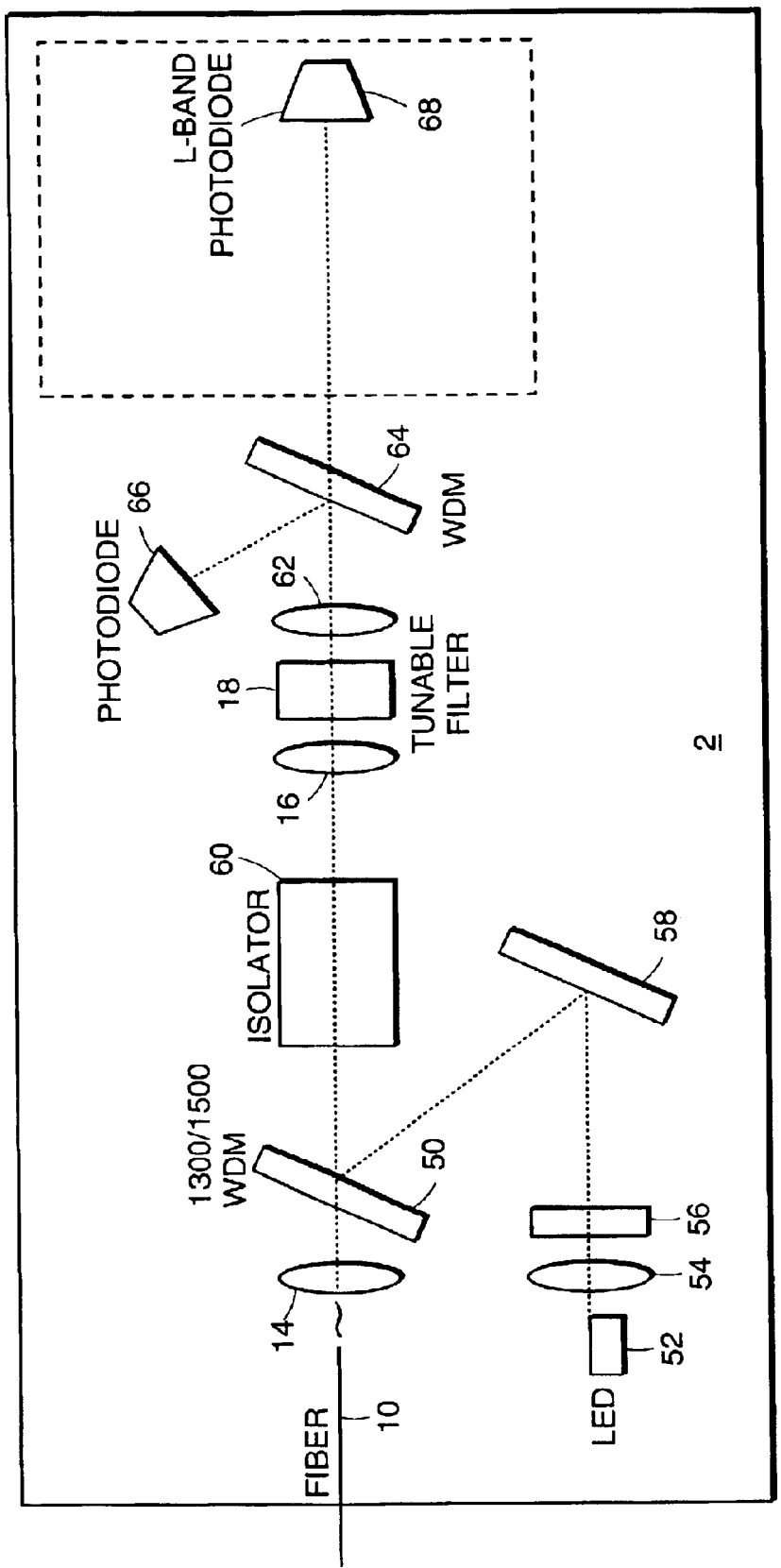
Figure 4:
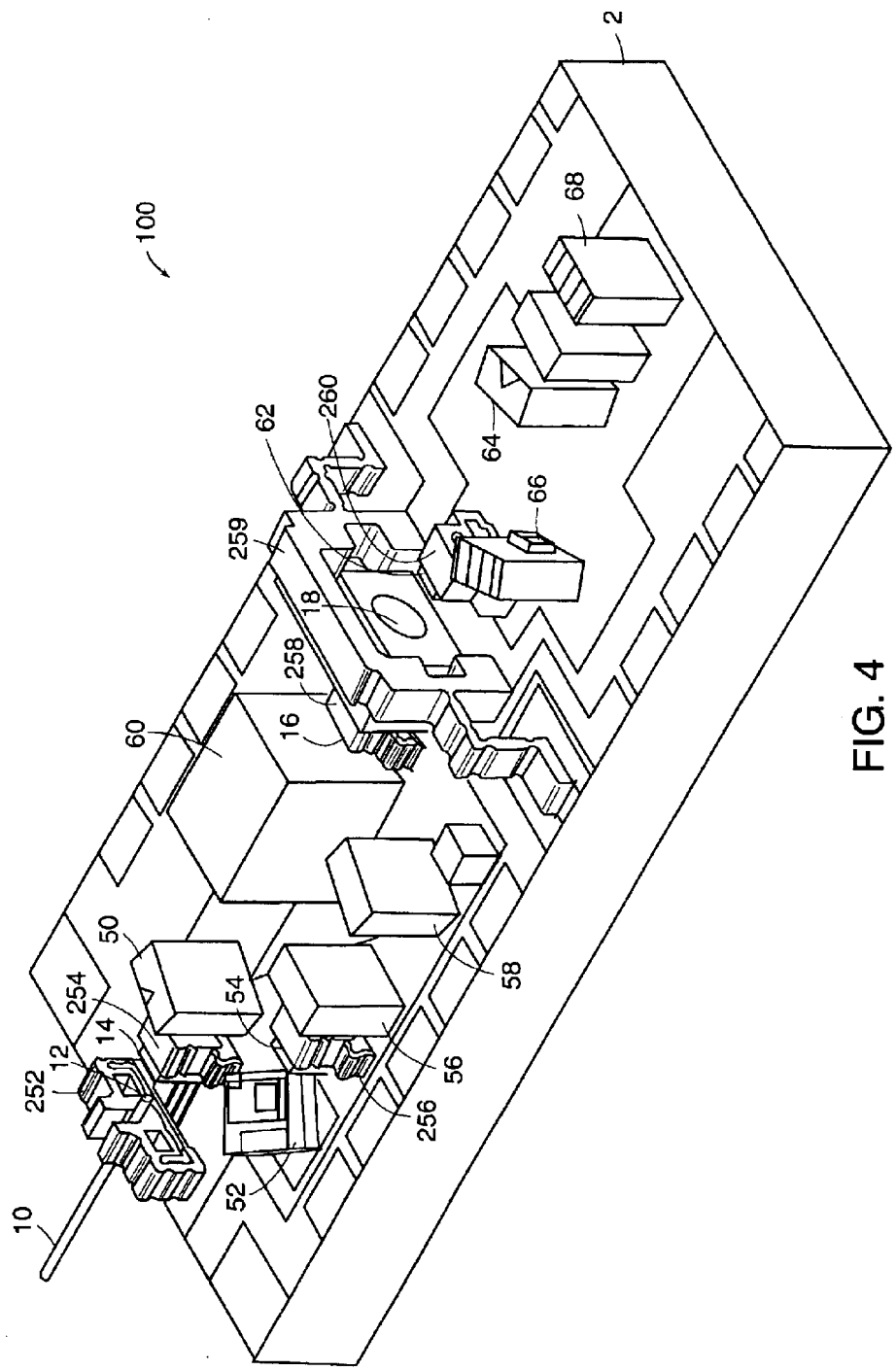
Figure 5:
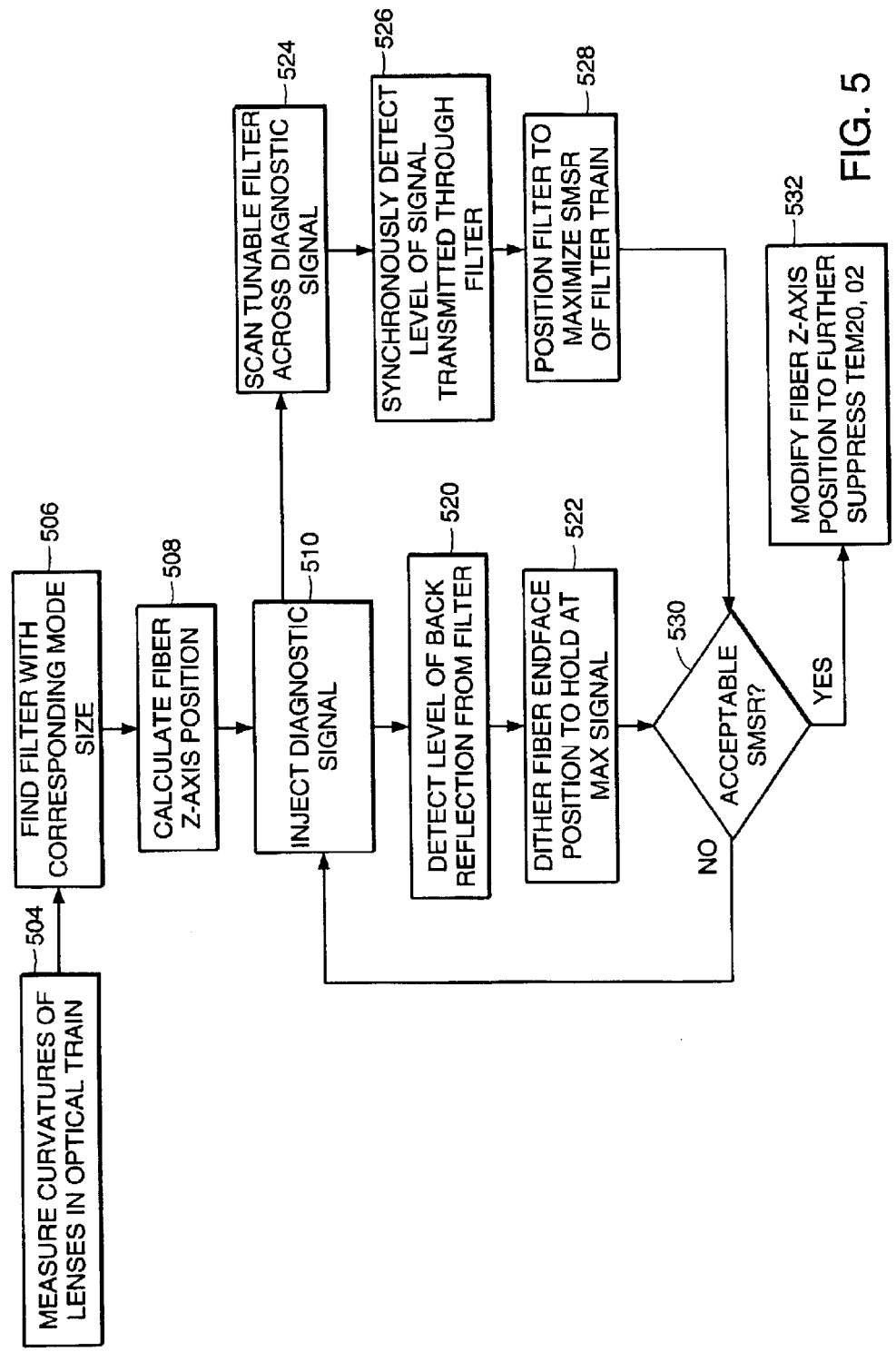
Figure 6:
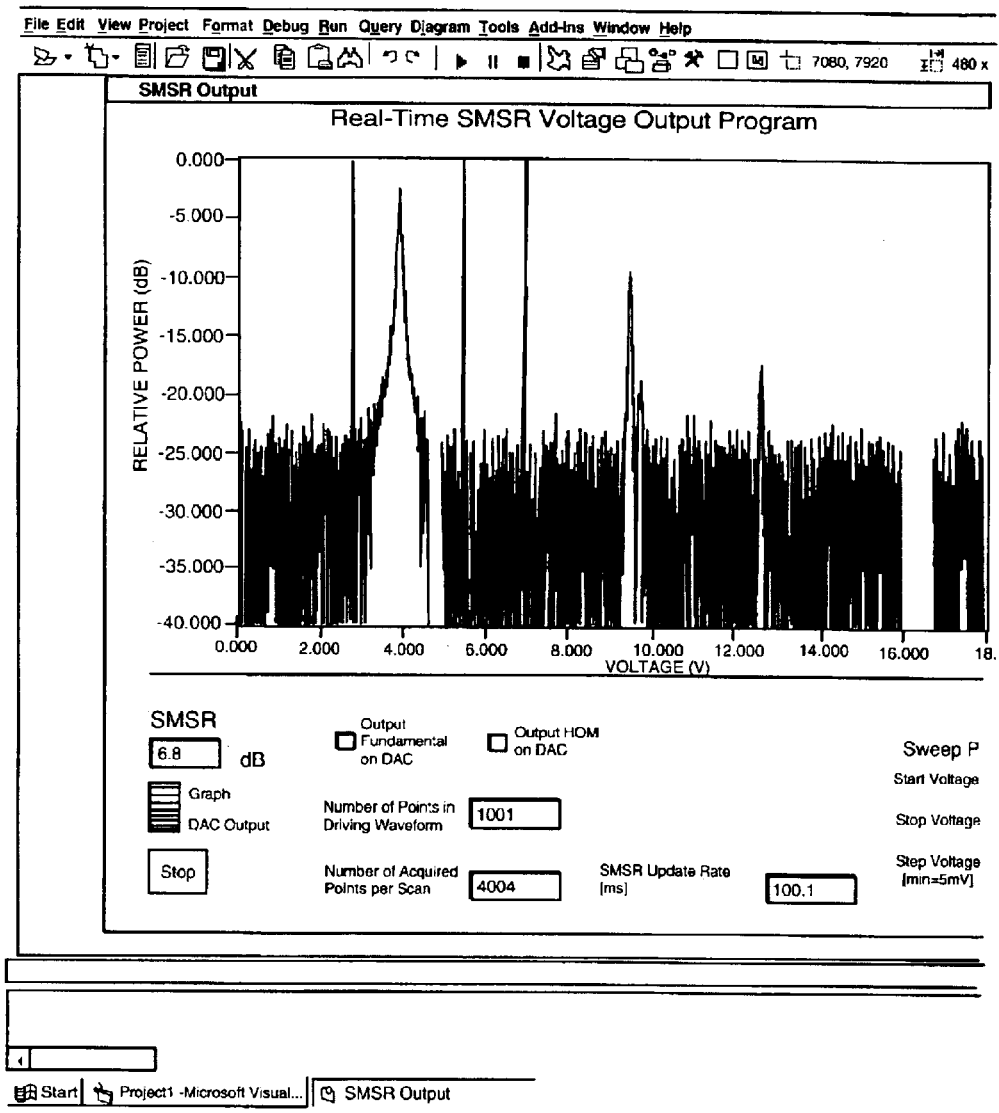

FIGS. 2A and 2B illustrates the energy distributions in the lowest order spatial mode TEM00 and the higher order Hermite-Gaussian modes. Orthogonal modes are not shown have been These energy distributions illustrate the importance of the filter train alignment relative to spatial filtering techniques. For example, spatial filtering such as provided by the insertion of single mode fiber or other spatial filters, while addressing with many of the modes, will generally not suppress the TEM20, 22 modes, for example, because of the substantial power on the optical axis of the beam.

FIG. 3 shows the entire optical train of the optical channel monitoring system to which the present invention is relevant in one application.

The fiber 10 terminates above an optical bench 2. The optical signal is emitted out of the typically cleaved or lens polished endface of the fiber.

The optical signal is typically diverging as it is emitted from the fiber's core. It is collimated by first lens 14. Currently, all lenses are formed utilizing mass-transport processes as described in U.S. Pat. No. 5,618,474, for example, the teachings of which are incorporated herein by this reference in their entirety. The invention, however, is compatible with other types of microlenses such as those generated by diffractive, binary optics, gradient index processes, or refractive element replication, for example.

A dichroic mirror 50 is used to add the reference signal to the optical signal 14, in one implementation. These dichroic mirrors or filters are typically referred to as WDM filters. In the illustrated implementation, the WDM filter 50 is reflective in a band surrounding 1300 nm, but transmissive in a band surrounding 1500 nm, in one configuration.

In the illustrated embodiment, the 1300 nm reference signal is generated by a light emitting diode 52. In one implementation, the light emitting diode is a super luminescent light emitting diode (SLED).

The diverging beam from the LED is collimated by a collimating lens 54. An etalon 56 is used to convert the relatively wide-band signal from the SLED into a reference signal with stable spectral characteristics. More specifically, the etalon 56 functions as a Fabry-Perot filter with a 200 GigaHertz (GHz) free spectral range (FSR). This effectively converts the SLED's continuous, broadband spectrum into a signal with energy peaks every 200 GHz. These peaks are stable, particularly when the temperature of the system is controlled by a thermoelectric cooler or is otherwise stabilized.

A fold mirror 58 redirects the reference signal to the WDM filter 50. It should be noted, however, that this mirror is not required, but is simply used to facilitate integration of the system on a compact bench.

The combined optical signal is transmitted through an isolator 60. This component is used to prevent back-reflections from the subsequent optical components into the fiber 10 during operation, but is installed on the bench after the SMSR alignment process described herein.

A second lens 60 is used to focus the collimated combined beam onto tunable filter 18. After the tunable filter, the beam is recollimated by a third collimating lens 62, and transmitted to a second dichroic/WDM filter 64.

The second WDM filter 64 functions to separate the filtered reference signal from the filtered optical signal in the filtered beam from the tunable filter 18. In the illustrated implementation, the second WDM filter 64 is reflective in a band around 1300 nm, but transmissive in a band around 1500 nm. As a result, the filtered reference signal is directed to the wavelength reference detector 66 for optical-to-electrical conversion.

The filtered optical signal is transmitted to a signal band detector 68. Either of the detectors 66 or 68 can be used as the detector 122 depending on the wavelength used for the diagnostic signal and whether the WDM filter 64 has been installed.

FIG. 4 illustrates the integration of the optical channel monitoring system on a single, miniature optical bench 2.

Specifically, the fiber 10 is terminated on the bench 2 at a mounting and alignment structure 252. This mounting and alignment structure 252 holds the fiber in proximity to the first collimating lens 14 held on its own mounting and alignment structure 254.

In the reference signal optical train, the SLED 52 generates the broadband beam, which is focused by the second collimating lens 54 held on mounting and alignment structure 256. This collimates the beam to pass through the etalon 56 installed on the bench 2, directly. The reference beam generated by the etalon is reflected by fold mirror 58 to the first WDM filter 50. As a result, the combined beam is transmitted to the isolator 60, which is installed directly on the bench 2 in the illustrated implementation.

After the isolator, a focusing lens 16 held on mounting and alignment structure 258 focuses the combined beam onto the tunable filter 18, which is held on the filter mounting and alignment structure 259. The beam from the filter 18 is re-collimated by a third collimating lens 62 held on mounting and alignment structure 260. This beam is then separated into the reference beam and the optical signal by a second WDM filter 64. The reference signal is detected by detector 66. The filtered optical signal is transmitted through the second WDM filter 64 to the signal photodiode 68.

According to the present implementation, the fiber alignment system and the filter alignment system align the position of the fiber endface 12 and the filter 18 by plastically deforming fiber mounting structure 252 and filter mounting structure 259. Alternatively, the alignment of the optical train is accomplished by moving other combinations of the endface 12, lenses 14 and 16, and filter 18, in other implementations. This is accomplished by deformation of the mounting structures 252, 254, 258, and 259 holding the corresponding elements.

The present inventions are applicable to other alignment schemes, however, such as laser hammering, micropositioning with laser welding or solder reflow techniques, to list a few examples.

FIG. 5 is a process diagram illustrating the filter train alignment process according to the present invention.

Specifically, in step 504, the radius of curvature of the lenses 14 and 16 is determined in a metrology step in combination with the positioning of the lenses on the bench 2. This information affects selection of the filter 18 from a filter inventory that has been binned based on filter's lowest order mode size in step 506.

Preferably, the filter 18 is located at a beam waist point (see reference numeral 550 in FIG. 1). This design criteria facilitates the subsequent alignment process since the beam spot size at the filter 18 will be not change, or exhibit little change, as the fiber endface 12 and/or the filter 18 are aligned in the x/y plane due to incident z-axis movement. Thus, the filter 18 is selected so that its lowest order mode size is matched to the waist diameter that is produced from the lenses 14 and 16.

With the filter 18 selected and the radii of lenses 14 and 16 known, an initial z-axis position of the fiber endface 12 is calculated. The fiber alignment system then locates the endface at this calculated position in the z-axis in step 508.

The active alignment process is then started with the diagnostic signal being injected into the train in step 510. The level of back reflection is detected from the filter in step 520. The position of the fiber endface is then actively aligned to hold the level of back reflection at the maximum in step 522 using controller 120 and fiber alignment system 110.

FIG. 6 shows a spectral response of a filter optical train before the SMSR suppression generated by the spectral response analyzer 126. The filter's main mode is evident along with two satellite modes, which degrade the train's SMSR. The horizontal axis is voltage corresponding to the tuning voltage, which functions as proxy for a time axis and corresponds roughly to frequency or wavelength in the described spectral detection scheme.

In the preferred embodiment, the fiber alignment system dithers the fiber endface in a circle. The change in the back-reflected signal is then monitored as a function of this dithering. The system finds the zero derivative point and thus, the location of the maximum back reflected signal. This yields near perfect angular alignment when the back reflection is maximized. In the preferred embodiment, the filter is slowly aligned while the fiber is dithered at a high rate.

Simultaneously with the active positioning of the fiber endface 12, the tunable filter is successively scanned across the diagnostic signal in step 524. Synchronously, the level of signal transmitted through the filter by the transmission detector 122 is detected in step 526. The filter is then positioned or aligned to maximize the SMSR of the filter train in step 528 by the controller 132 and alignment system 134. This process has the effect of targeting modes such as TEM10, 01 for suppression. A "hill climbing" alignment algorithm is used in one example.

In an alternative implementation, a broadband signal can be used as the diagnostic signal as, for example, as generated by a super luminescent light emitting diode (SLED) or spontaneous emission for a fiber amplifier. At the other end of the filter train, the broadband signal is detected and its spectrum analyzed. Generally, this system is viewed as inferior because of the time associated with the spectral analysis would slow the alignment process.

In still another implementation, either the fiber or the filter is positioned for SMSR and train alignment. This approach makes the control algorithm more complex, however.

The fiber endface positioning and filter positioning continue until an acceptable SMSR is achieved as determined in step 530. Presently, SMSR of greater than 20 dB is typical, with an SMSR of 40 dB available at low yields.

In a final, optional tuning step 532, the z-axis position of the fiber endface 12, or possibly filter 18 is modified to optimize the overlap integral between the size of the input beam and the even modes such as TEM02, 02 of the filter 18. These modes are symmetric about the center axis with the central lobe having a different phase then at least some of the side lobes, and thus are not suppressed simply by centering the launched beam. Examples of such modes are the TEM 20 and 40 and the related orthogonal modes. The overlap integral is preferably minimized to target these modes for further suppression by a final active tuning of the spot size.

Figure 7:
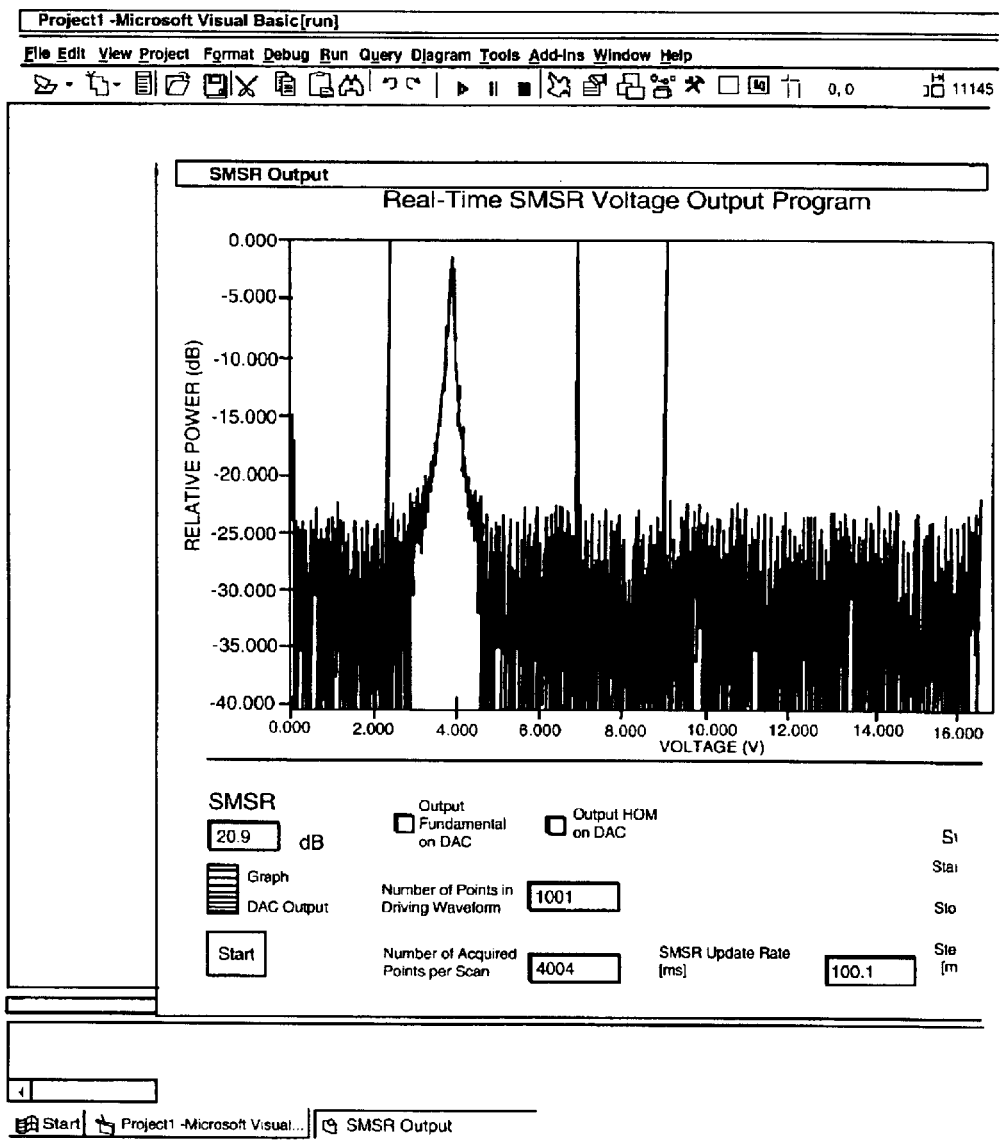
FIG. 7 is a plot of transmitted power as a function of tuning voltage for a tunable filter train, which has been aligned using the present invention.

FIG. 7 shows a spectral response of a filter optical train after the SMSR suppression. Only the filter's main mode is evident above the noise floor.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for tunable filter train alignment, comprising:
   detecting a spectral response of the filter train;
   aligning an optical fiber that transmits an input optical signal to the filter train during operation of the filter train; and
   moving a Fabry-Perot tunable filter relative to the tunable filter in response to a spectral response of the filter train.

2. A process as claimed in claim 1, wherein the step of aligning the optical fiber comprises:
   injecting a diagnostic signal into the filter train;
   detecting a level of the diagnostic signal that is coupled into the optical fiber; and
   moving an endface of the optical fiber in response to the level of the diagnostic signal that is coupled into the optical fiber.

3. A process as claimed in claim 1, wherein the step of aligning the optical fiber comprises:
   injecting a diagnostic signal into the filter train;
   detecting a level of the diagnostic signal that is coupled into the optical fiber; and
   moving an endface of the optical fiber to maximize the level of the diagnostic signal that is coupled into the optical fiber.

4. A process as claimed in claim 1, wherein the step of aligning the optical fiber comprises:
   injecting a diagnostic signal into the filter train via the optical fiber;
   detecting a level of the diagnostic signal that is back reflected by the tunable filter and coupled into the optical fiber; and
   moving an endface of the optical fiber in response to the level of the back reflected diagnostic signal that is coupled into the optical fiber.

5. A process as claimed in claim 1, further comprising detecting a level of a side mode in the spectral response.

6. A process as claimed in claim 5, wherein the step of moving the tunable filter comprises aligning the filter relative to the filter train to minimize the level of the side mode.

7. A process as claimed in claim 1, further comprising detecting a side mode suppression ratio of the spectral response.

8. A process as claimed in claim 7, wherein the step of moving the tunable filter comprises aligning the filter relative to the filter train to maximize the side mode suppression ratio.

9. A process as claimed in claim 1, wherein the step of detecting the spectral response of the filter train comprises:
   injecting an diagnostic optical signal into the filter train; and
   tuning the tunable filter across the spectrum of the diagnostic optic signal.

10. A process as claimed in claim 9, wherein the step of detecting the spectral response of the filter train further comprises plotting a magnitude of the diagnostic optical signal that is transmitted through the filter train as a function of time to graphically depict the spectral response of the filter train.

11. A calibration system for a filter train including a Fabry-Perot tunable filter, the calibration system comprising:
    a filter alignment system for positioning the tunable filter relative to the filter train;
    a signal generator for injecting a diagnostic signal into the filter train;
    a detection system that detects the diagnostic signal after interaction with the tunable filter and generates information concerning a spectral response; and
    a control system that controls the filter alignment system in response to the detected spectral response information.

12. A calibration system as claimed in claim 11, wherein the filter alignment system positions the tunable filter in a plane that is orthogonal to an optical axis of the filter train.

13. A calibration system as claimed in claim 11, wherein the signal generator is a single frequency laser.

14. A calibration system as claimed in claim 11, further comprising a tunable filter controller that tunes the tunable filter across the diagnostic signal.

15. A calibration system as claimed in claim 11, wherein the signal generator generates a signal having a bandwidth greater than spectral distance between a main mode and a side mode of the tunable filter.

16. A calibration system as claimed in claim 15, wherein the detection system comprises a spectral analyzer that determines a spectrum of the diagnostic signal transmitted through the tunable filter.

17. A calibration system as claimed in claim 11, further comprising a fiber alignment system for positioning an endface an optical fiber that transmits an input optical signal to the filter train relative to the filter train.

18. A calibration system as claimed in claim 17, wherein diagnostic signal generator injects the diagnostic signal into the filter train via the optical fiber.

19. A calibration system as claimed in claim 18, further comprising a backreflection detector that detects a back-reflected portion of the diagnostic signal that is reflected by the tunable filter and coupled into the optical fiber through the endface.

20. A calibration system as claimed in claim 19, further comprising fiber alignment system controller that controls the fiber alignment system in response to a level of the signal from the backreflection detector.

21. A calibration system as claimed in claim 11, wherein the detection system detects a level of a side mode in the spectral response.

22. A calibration system as claimed in claim 21, wherein the control system activates filter alignment system to move the tunable filter relative to the filter train to minimize the level of the side mode.

23. A calibration system as claimed in claim 11, wherein the detection system detects a side mode suppression ratio of the spectral response.

24. A calibration system as claimed in claim 21, wherein the control system activates filter alignment system to move the tunable filter relative to the filter train to maximize the side mode suppression ratio.

25. A calibration system as claimed in claim 11, further comprising a video monitor for graphically displaying the spectral response information.

26. A process for tunable filter train alignment, comprising:

detecting a spectral response of the filter train by scanning a Fabry-Perot tunable filter of the filter train across an optical signal;

aligning the filter train in response to the detected spectral response.

27. A process as claimed in claim 26, wherein the step of aligning the filter train comprises moving the tunable filter relative to the tunable filter train.

28. A process as claimed in claim 26, wherein the step of aligning the filter train comprises aligning a fiber endface to maximize the angular alignment of the filter train.

29. A process as claimed in claim 28, wherein the step of aligning the optical fiber endface comprises:

injecting a diagnostic signal into the filter train;

detecting a level of the diagnostic signal that is coupled into the optical fiber; and moving an endface of the optical fiber in response to the level of the diagnostic signal that is coupled into the optical fiber.

30. A process as claimed in claim 28, wherein the step of aligning the optical fiber endface comprises:

injecting a diagnostic signal into the filter train via the optical fiber;

detecting a level of the diagnostic signal that is back reflected by the tunable filter and coupled into the optical fiber; and moving an endface of the optical fiber in response to the level of the back reflected diagnostic signal that is coupled into the optical fiber.

31. A process as claimed in claim 26, wherein the step of aligning the filter train comprises moving the tunable filter to minimize the level of a side mode.

32. A process as claimed in claim 26, wherein the step of detecting the spectral response of the filter train further comprises plotting a magnitude of the diagnostic optical signal that is transmitted through the filter train as a function of time to graphically depict the spectral response of the filter train.

* * * * *